(12) United States Patent
Burwell

(10) Patent No.: US 6,190,200 B1
(45) Date of Patent: Feb. 20, 2001

(54) LAMP HOLDER BASE AND ATTACHMENT METHOD

(75) Inventor: John W. Burwell, Rome City, IN (US)

(73) Assignee: Lyall Assemblies, Inc., Albion, IN (US)

( * ) Notice: Under 35 U.S.C. 154(b), the term of this patent shall be extended for 0 days.

(21) Appl. No.: 09/362,778

(22) Filed: Jul. 28, 1999

(51) Int. Cl.[7] .............................. H01R 13/73; H02B 1/01
(52) U.S. Cl. .......................................... 439/557; 439/549
(58) Field of Search ................................... 439/544, 545, 439/549, 557, 558, 552, 553, 554, 555, 556, 239, 240, 241, 226; 29/876

(56) References Cited

U.S. PATENT DOCUMENTS

| | | | |
|---|---|---|---|
| 1,768,422 | * 6/1930 | Russel et al. | 439/545 |
| 3,384,858 | * 5/1968 | Johnson | 439/237 |
| 4,744,767 | * 5/1988 | Henrici et al. | 439/226 |
| 5,993,264 | * 11/1999 | Daoud | 439/557 |
| 6,030,242 | * 2/2000 | Cunningham et al. | 439/247 |

* cited by examiner

Primary Examiner—Paula Bradley
Assistant Examiner—Antoine Ngandjui

(74) Attorney, Agent, or Firm—Taylor & Aust, P.C.

(57) ABSTRACT

Apparatus and method for providing simple and effective attachment of a lamp holder base to a mounting plate includes providing in the mounting plate an opening having a wide opening portion and a relatively narrower opening portion, which together define at least one mounting tab of the mounting plate, the mounting plate further having an outer surface and a latch edge portion; providing on the lamp holder base an elongated body and a latch member, the elongated body including at least one mounting channel having a base surface and an inclined surface which define a first channel opening and a second channel opening, the inclined surface terminating at the first channel opening to define a pivot edge, the latch member including a latch surface region; inserting the elongated body in the wide opening portion until a cross section of the mounting plate is generally aligned with one of the first channel opening and the second channel opening; moving the mounting plate in a direction such that the at least one mounting tab engages the at least one mounting channel; aligning generally the latch member with the latch edge portion of the mounting plate; and rotating the mounting plate about the pivot edge until the latch surface region engages a portion of the outer surface of the mounting plate.

20 Claims, 3 Drawing Sheets

LAMP HOLDER BASE AND ATTACHMENT METHOD

BACKGROUND OF THE INVENTION

1. Field of the Invention

The present invention relates to a lamp holder assembly, and more particularly, to a lamp holder base and attachment method for providing simple and effective attachment of the lamp holder base to a mounting plate.

2. Description of the Related Art

It is known to provide a lamp holder for an illuminating lamp, e.g., an incandescent or flourescent lamp, which includes a socket to establish both mechanical and electrical connections to the illuminating device, as well as a base for providing attachment of the lamp holder to a mounting plate. The mounting plate could be, for example, a plate member of a light fixture, a back panel of a refrigerator, or a portion of an automobile dash.

One known approach for providing attachment of the lamp holder to a mounting plate is to include a threaded mounting sleeve on the lamp holder base, and provide a corresponding hole in the mounting plate. The threaded mounting sleeve is positioned in and passed through the hole in the mounting plate, such that a portion of the threaded mounting sleeve extends past a back surface of the mounting plate. A nut is then treaded onto the portion of the threaded mounting sleeve which extends past the back surface of the mounting plate to secure the lamp holder to the mounting plate.

One disadvantage to such an approach is that the mounting means must be provided as two discrete parts, i.e., the treaded sleeve and the nut. When installing the lamp holder in close quarters, such as on a back panel of a refrigerator or in a dash of an automobile, it is possible to cross-thread the nut onto the treaded portion. Such cross-threading can result in the destruction of the lamp base and/or the nut, and an inferior attachment of the lamp holder base to the mounting plate. In addition, the nut may be dropped during attempted installation, thereby resulting in increased installation time and frustration, and possibly the loss of the nut.

Another approach is to provide a pair of simple mounting clips on the lamp holder base and provide a corresponding pair of slots in the mounting plate for receiving the pair of mounting clips. Generally, however, such an arrangement results in a loose fit between the lamp holder base and the mounting plate.

Thus, a need exists for a lamp holder base which can consistently provide effective attachment of the lamp holder to the mounting plate, and which is simple to install.

SUMMARY OF THE INVENTION

The present invention provides effective attachment of a lamp holder to the mounting plate, and is simple to install.

The invention comprises, in one form thereof, a lamp holder base for mounting a lamp holder to a mounting plate. The lamp holder base includes a bridge member having a first end, a second end and a support surface extending along a support plane; a latch member coupled to the first end of the bridge member and which extends away from the support surface; and an elongate body coupled to the second end of the bridge member and which extends away from the support surface. The elongate body includes a first region spaced apart from a second region, wherein a first mounting channel is located in the first region and a second mounting channel is located in the second region. Each of the first and second mounting channels including a pair of non-parallel opposing surfaces.

Preferably, the pair of non-parallel opposing surfaces of each of the first and second mounting channels includes a base surface substantially coplanar with the support surface and an inclined surface which diverges from the base surface. The pair of non-parallel opposing surfaces further define a first channel opening and a second channel opening, wherein at the first channel opening the base surface is spaced a first distance from the inclined surface and at the second channel opening the base surface is spaced a second distance from the inclined surface. The inclined surface terminates at the first channel opening to define a pivot edge. Preferably, the first distance is substantially equal to a thickness of the mounting plate.

Also preferably, the latch member includes a resilient portion having a first end, and the resilient portion extends from the support surface toward the first end. A latch finger is provided which extends from the resilient portion. The latch finger includes a latch surface region spaced from the support plane by an amount substantially corresponding to the first distance. Preferably, the first distance is substantially equal to a thickness of the mounting plate.

A preferred method of the invention for providing simple and effective attachment of a lamp holder base to a mounting plate includes the steps of providing in the mounting plate an opening having a wide opening portion and a relatively narrower opening portion, which together define at least one mounting tab of the mounting plate, the mounting plate further having an outer surface and a latch edge portion; providing on the lamp holder base an elongated body and a latch member, the elongated body including at least one mounting channel having a base surface and an inclined surface which define a first channel opening and a second channel opening, the inclined surface terminating at the first channel opening to define a pivot edge, the latch member including a latch surface region; inserting the elongated body in the wide opening portion until a cross section of the mounting plate is generally aligned with one of the first channel opening and the second channel opening; moving the mounting plate in a direction such that the at least one mounting tab engages the at least one mounting channel; aligning generally the latch member with the latch edge portion of the mounting plate; and rotating the mounting plate about the pivot edge until the latch surface region engages a portion of the outer surface of the mounting plate.

One advantage of the present invention is that the lamp holder base consistently provides effective attachment of the lamp holder to the mounting plate.

Another advantage of the present invention is that the lamp holder base is simple to install, and installation can be performed without the need for tools.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate preferred embodiments of the invention, and such exemplifications are not to be construed as limiting the scope of the invention in any manner.

DETAILED DESCRIPTION OF THE INVENTION

Figure 1:
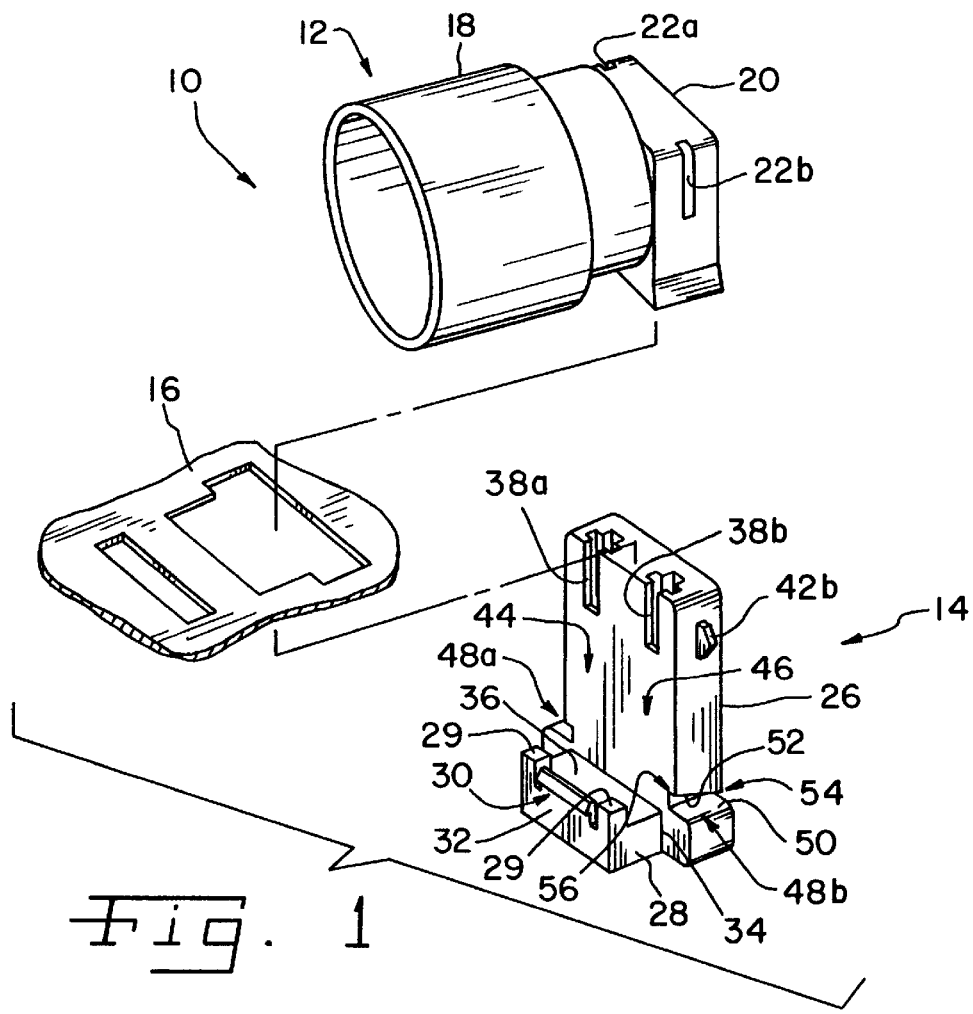
FIG. 1 is an exploded perspective view of a lamp holder assembly including a lamp holder base of the present invention.
Figure 2:
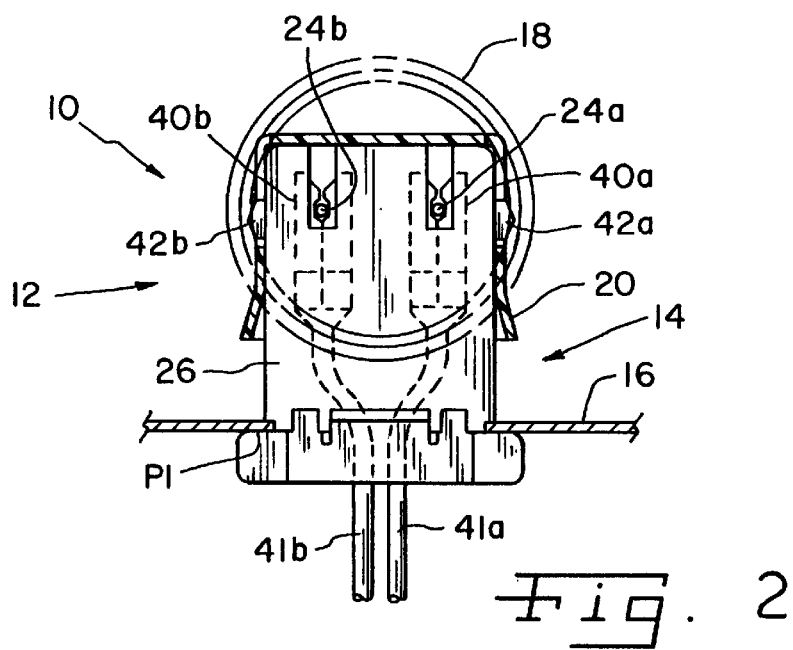
FIG. 2 is a back sectional view of the lamp holder assembly of FIG. 1.

Referring now to the drawings and particularly to FIG. 1 and 2, there is shown in exploded form a lamp holder assembly 10 having a lamp holder socket 12 and a lamp holder base 14 for attachment to either of two exemplifications of mounting plates 16, 160.

As shown in FIGS. 1 and 2, lamp holder socket 12 includes an annular lamp housing 18 and a base attachment housing 20. Annular lamp housing 18 includes means (not shown) for providing mechanical connection to an illuminating lamp (not shown). Base attachment housing 20 includes a pair of slots 22a, 22b used for securing lamp holder socket 12 to base 14. Lamp holder socket 12, when coupled with a fluorescent lamp, retains a pair of electrical contact pins 24a, 24b of the fluorescent lamp.

Lamp holder base 14 provides mechanical connection to lamp holder socket 12 and mechanical attachment to mounting plate 16. Preferably, base 14 is formed as a unitary structure, and includes an elongate body 26, a bridge member 28, a pair of pillars 29 and a latch member 30. As shown in FIG. 1, elongate body 26 and latch member 30 are spaced apart by bridge member 28. Pillars 29 provide structural support to base 14 in directions parallel to plate 16 to prevent undue loading on latch member 30.

Bridge member 28 includes a first end 32, a second end 34 and a support surface 36 extending along a support plane P1. Latch member 30 is integrally coupled to bridge member 28 between first end 32 and support surface 36, and extends perpendicularly away from support surface 36. Second end 34 of bridge member 28 extends laterally from and is integrally coupled to elongate body 26, such that elongate body 26 extends perpendicularly away from support surface 36.

Elongate body 26 includes a pair of electrical contact slots 38a, 38b which are adapted to position electrical connector clips 40a, 40b (shown partially by phantom lines) for receiving contact pins 24a, 24b, respectively, as base attachment housing 20 of lamp holder socket 12 slidably receives elongate body 26 of lamp holder base 14 during final assembly. Electrical power is supplied to connector clips 40a, 40b via conductors 41a, 41b, respectively. Elongate body 26 further includes a pair of tabs 42a, 42b which engage slots 22a, 22b, respectively, of base attachment housing 20 to secure lamp holder socket 12 to base 14.

Elongate body 26 further includes a first region 44 spaced apart from a second region 46, and a pair of mounting channels 48a, 48b. Mounting channels 48a, 48b are designed to guide and slidably receive a portion of mounting plate 16. First mounting channel 48a is located in first region 44 and second mounting channel 48b located in second region 46. First and second regions 44,46, including mounting channels 48a,48b, are substantially symmetrical, and thus discussions pertaining to one is equally applicable to the other.

Each of the mounting channels 48a, 48b including a pair of non-parallel opposing surfaces 50,52, which are more particularly described as including an inclined surface 52 which diverges from base surface 50. As can be best seen in FIGS. 4, 5, 7 and 8, base surface 50 is substantially coplanar with support surface 36 of bridge member 28 and surface plane P1. Each of first and second mounting channels 48a, 48b further define a first channel opening 54 and a second channel opening 56. Inclined surface 52 terminates at opening 54 to define a pivot edge 58.

Figure 4:
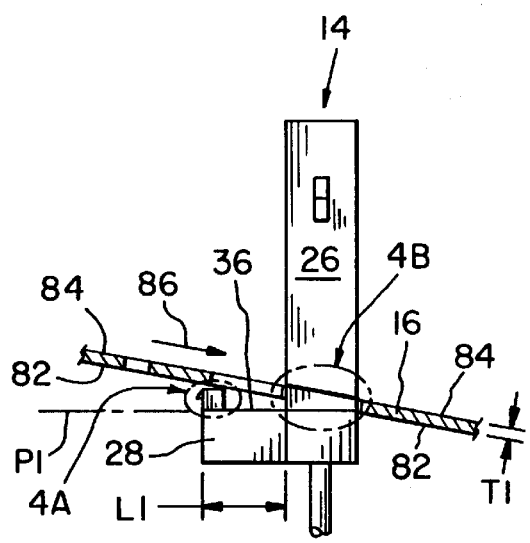
FIG. 4 is a sectioned side view of the frame member of FIG. 3 receiving the lamp holder base of the present invention during an initial stage of installation.
Figure 4A:
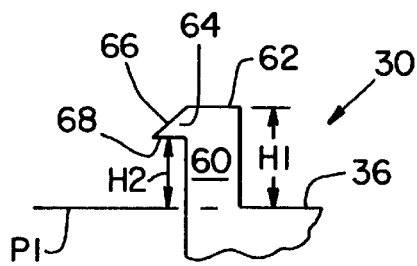
FIG. 4A is a break-out view of the resilient portion of the latch members shown in FIG. 4.
Figure 4B:
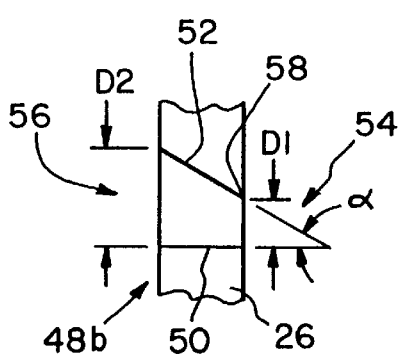
FIG. 4B is a break-out view of the mounting channel in the elongate body shown in FIG. 4.
Figure 7:
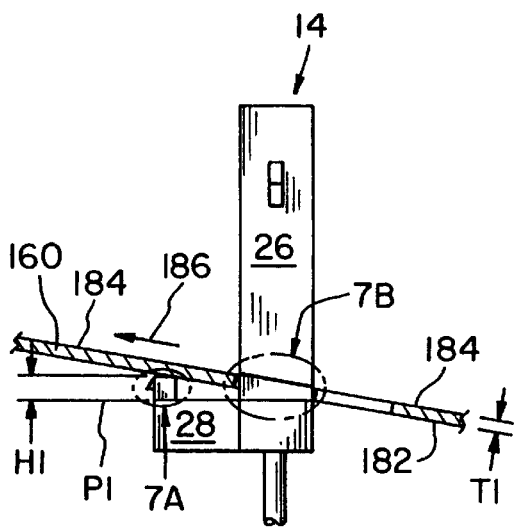
FIG. 7 is a sectioned side view of the frame member of FIG. 6 receiving the lamp holder base of the present invention during an initial stage of installation.
Figure 7A:
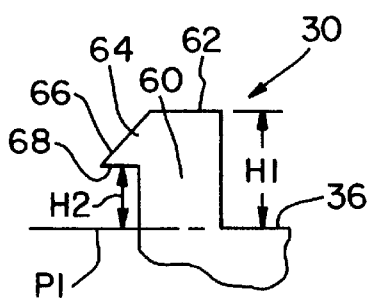
FIG. 7A is a break-out view of the resilient portion of the latch members shown in FIG. 7.
Figure 7B:
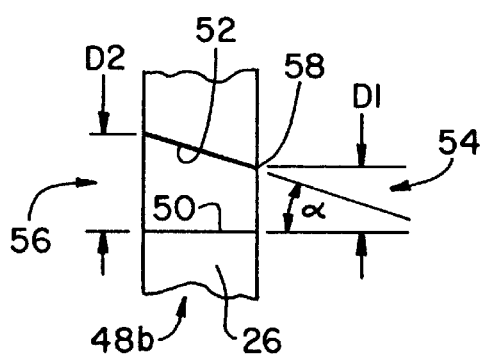
FIG. 7B is a break-out view of the mounting channel in the elongate body shown in FIG. 7.

As more clearly shown in FIGS. 4B and 7B, each being an enlarged break-out portion of FIGS. 4 and 7, respectively, at channel opening 54, the base surface 50 is spaced a distance D1 from pivot edge 58 of inclined surface 52. At channel opening 56, the base surface 50 is spaced a distance D2 from inclined surface 52.

In preferred embodiments of the invention, distance D1 is selected to be substantially equal to, but slightly larger than the thickness T1 of mounting plate 16 to which the base is to be attached. Thus, preferably, distance D1 is selected such that channel opening 54 provides a snug, but slidable, engagement of a respective portion of the mounting plate between pivot edge 58 and base surface 50. The distance D2, and thus the angular orientation α between base surface 50 and inclined surface 52, is dependent upon the length L1 of bridge member 28 and the height H1 of latch member 30.

Also, as more clearly shown in FIGS. 4A and 7A, each being another enlarged break-out portion of FIGS. 4 and 7, respectively, latch member 30 includes a resilient portion 60 having a first end 62, and a latch finger 64 having a bevel surface 66 and a latch surface region 68. Resilient portion 60 extends generally perpendicularly away from support surface 36 toward first end 62. Latch finger 64 extends outwardly from resilient portion 60. Preferably, latch surface region 68 is spaced from support plane P1 (which extends from support surface 36) by an amount H2 substantially corresponding to distance D1, which in turn is substantially equal to the thickness T1 of mounting plate 16.

As shown in FIG. 1, lamp holder base 14 is capable of accommodating a variety of shapes of mount openings, as depicted by mounting plates 16, 160, and as will be more particularly described with respect to FIGS. 3–5 and 6–8, respectively.

Figure 3:
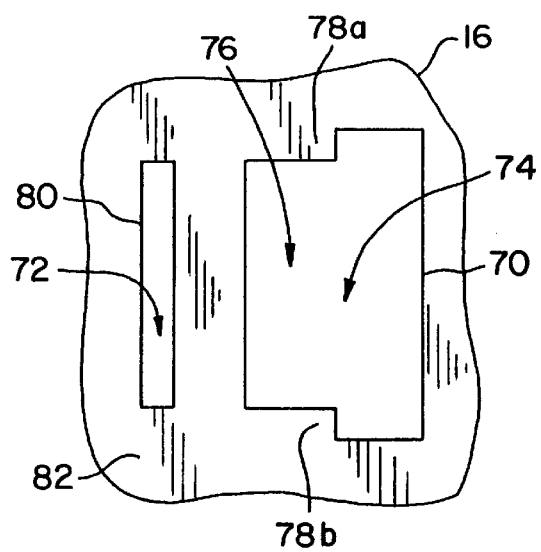
FIG. 3 shows a first embodiment of a frame member for receiving the lamp holder base of the present invention.

FIG. 3 shows a break-out portion of mounting plate 16 having formed therein a T-shaped opening 70 and a slot 72. T-shaped opening 70 includes a wide opening portion 74 and a relatively narrower opening portion 76, which together define a pair of mounting tabs 78a, 78b of mounting plate 16. Slot 72 is generally rectangular in shape, and defines a latch edge 80. Wide opening portion 74 is sized to slidably receive elongate body 26 without having to force elongate body 26 into wide opening 74. As shown in FIG. 4, mounting plate 16 has an inner surface 82 and an outer surface 84.

Figure 5:
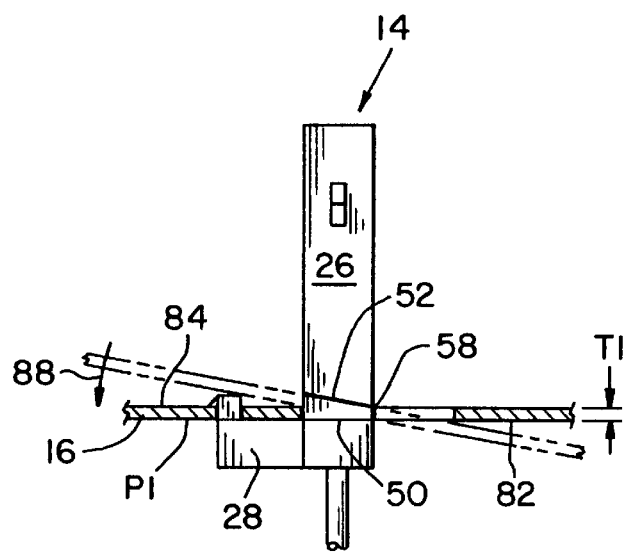
FIG. 5 is a sectioned side view of the frame member of FIG. 3 receiving the lamp holder base of the present invention during final stages of installation.

FIGS. 4 and 5 shown the progression of installation of lamp holder base 14 onto mounting plate 16. As shown in FIG. 4 in relation to FIG. 3, elongated body 26 inserted through wide opening portion 74 until the cross section of mounting plate 16 is generally aligned with channel opening 56. Thereafter, mounting plate 16 is moved in the direction depicted by arrow 86 such that tabs 78a, 78b engage mounting channels 48a, 48b, respectively, and ultimately tabs 78a, 78b are slidably received between respective pivot edges 58 and base surfaces 50, and begin to pass through openings 54. The movement continues until latch member 30 is generally aligned with slot 72.

Referring to FIG. 5 in relation to FIG. 3, mounting plate is then rotated in the direction depicted by arrow 88 substantially about pivot edge 58, such that end 62 of latch member 30 begins to enter slot 72, at which time bevel surface 66 contacts latch edge 80. Then, sufficient force is applied to mounting plate 16 to cause resilient portion 60 to deflect as the incline of bevel surface 66 progresses along latch edge 80 and until latch finger 64 passes completely through slot 72. At this time, resilient portion 60 regains its original non-deflected orientation and at least a portion of latch surface region 68 of latch finger 64 engages a portion of outer surface 84 of mounting plate 16.

Accordingly, lamp holder base 14 is securely fastened to mounting plate 16 between support surface 36 and/or base surface 50 which contact inner surface 82 of mounting plate 16 and the containment surface provided by pivot edge 58 and latch surface region 68 contacting outer surface 84 of mounting plate 16. The amount of compressing force, if any, applied to mounting plate 16 by the combined affects of support surface 36, base surface 50, pivot edge 58 and latch surface region 68 is dependent on how close dimensions D1 and H2 are to being equal to the thickness T1 of plate 16.

Those skilled in the art will recognize that, alternatively, lamp holder base 14 can be moved relative to mounting plate 16 in directions opposite those depicted by arrows 86, 88 in practicing the attachment method described above.

Figure 6:
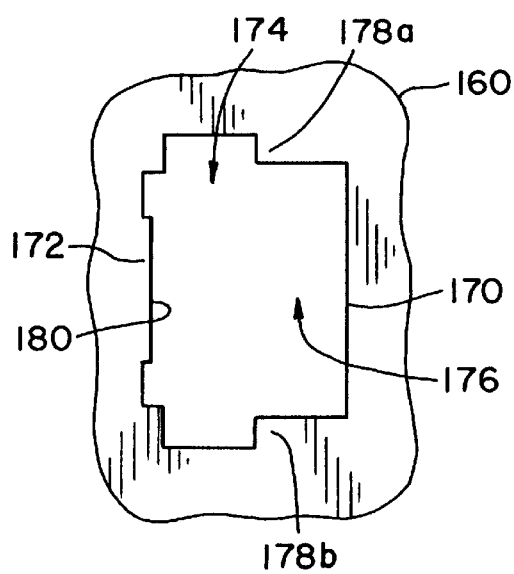
FIG. 6 shows a second embodiment of a frame member for receiving the lamp holder base of the present invention.
Figure 8:
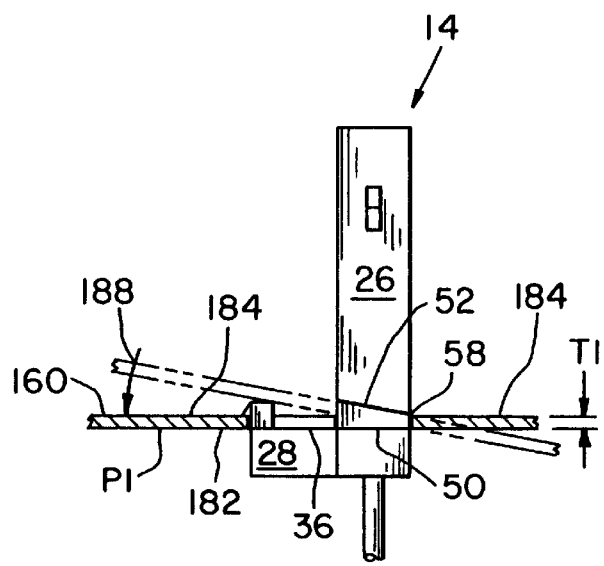
FIG. 8 is a sectioned side view of the frame member of FIG. 6 receiving the lamp holder base of the present invention during an final stages of installation.

FIGS. 6–8 illustrate an alternative mounting plate 160 and a method for mounting lamp base holder 14 thereonto. FIG. 6 shows a break-out portion of mounting plate 160 having formed therein a modified T-shaped opening 170 and a latch tab 172. T-shaped opening 170 includes a wide opening portion 174 and a relatively narrower opening portion 176, which together define a pair of mounting tabs 178a, 178b. Latch tab 172 is generally rectangular in shape, and defines a latch edge 180. Wide opening portion 174 is sized to slidably receive elongate body 26 without having to force elongate body 26 into wide opening 174. As shown in FIG. 7, mounting plate 160 includes an inner surface 182 and an outer surface 184.

FIGS. 7 and 8 show the progression of installation of lamp holder base 14 onto mounting plate 160. As shown in 7 in relation to FIG. 6, elongate body 26 is inserted through wide opening portion 174 until the cross section of mounting plate 160 is generally aligned with channel opening 54. Thereafter, mounting plate 160 is moved in the direction of arrow 186 such that tabs 178a, 178b engage mounting channels 48a, 48b, respectively, and are slidably received between respective pivot edges 58 and base surfaces 50. The movement continues until latch member 30 is generally aligned with latch edge 180.

Referring to FIG. 8, mounting plate is then rotated in the direction depicted by arrow 188 substantially about pivot edge 58, such that end 62 of latch member 30 begins to enter wide opening portion 174, at which time bevel surface 66 contacts latch edge 180. Then, sufficient force is applied to mounting plate 16 to cause resilient portion 60 to deflect as the incline of bevel surface 66 progresses along latch edge 180 and until latch finger 64 passes completely through opening 170. At this time, resilient portion 60 regains its original non-deflected orientation and at least a portion of latch surface region 68 of latch finger 64 engages a portion of outer surface 184 of mounting plate 160.

Accordingly, lamp holder base 14 is securely fastened to mounting plate 160 between support surface 36 and/or base surface 50 which contacts inner surface 182 of mounting plate 160 and the containment surface provided by pivot edge 58 and latch surface region 68 contacting outer surface 184 of mounting plate 160. The amount of compressing force, if any, applied to mounting plate 160 by the combined affects of support surface 36, base surface 50, pivot edge 58 and latch surface region 68 is dependent on how close dimensions D1 and H2 are to being equal to the thickness T1 of plate 160.

Those skilled in the art will recognize that, alternatively, lamp holder base 14 can be moved relative to mounting plate 160 in directions opposite those depicted by arrows 186, 188 in practicing the attachment method described above.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A lamp holder base for mounting a lamp holder to a mounting plate, comprising:

a bridge member having a first end, a second end and a support surface extending along a support plane;

a latch member coupled to said first end of said bridge member and extending away from said support surface; and an elongate body coupled to said second end of said bridge member and extending away from said support surface, said elongate body having a first region spaced apart from a second region, said elongate body including a first mounting channel located in said first region and a second mounting channel located in said second region, wherein each of the first and second mounting channels include a pair of non-parallel opposing surfaces.

2. The lamp holder of claim 1, wherein said bridge member, said latch member and said elongate body are formed as a unitary structure.

3. The lamp holder base of claim 1, wherein said pair of non-parallel opposing surfaces of each of said first and second mounting channels comprises:

a base surface substantially coplanar with said support surface; and an inclined surface which diverges from said base surface.

4. The lamp holder base of claim 3, wherein said pair of non-parallel opposing surfaces of each of said first and second mounting channels define a first channel opening and a second channel opening, wherein at said first channel opening said base surface is spaced a first distance from said inclined surface and at said second channel opening said base surface is spaced a second distance from said inclined surface.

5. The lamp holder base of claim 4, wherein said inclined surface terminates at said first channel opening to define a pivot edge.

6. The lamp holder base of claim 4, wherein said first distance is substantially equal to a thickness of said mounting plate.

7. The lamp holder base of claim 4, wherein said latch member comprises:

a resilient portion having a first end, said resilient portion extending from said support surface toward said first end; and a latch finger extending from said resilient portion, said latch finger having a latch surface region spaced from said support plane by an amount substantially corresponding to said first distance.

8. The lamp holder base of claim 7, wherein said first distance is substantially equal to a thickness of said mounting plate.

9. The lamp holder base of claim 1, wherein said latch member comprises:

a resilient portion having a first end, said resilient portion extending from said support surface toward said first end; and a latch finger extending from said resilient portion, said latch finger having a latch surface region spaced from said support plane by a first distance.

10. The lamp holder of claim 9, wherein said first distance is approximately equal to a thickness of said mounting plate.

11. The lamp holder base of claim 9, wherein said finger includes a bevel surface adjacent said first end of said resilient portion.

12. A method of attaching a lamp holder base to a mounting plate, comprising the steps of:

providing in said mounting plate an opening having a wide opening portion and a relatively narrower opening portion, which together define at least one mounting tab of said mounting plate, said mounting plate further having an outer surface and a latch edge portion;

providing on said lamp holder base an elongated body and a latch member, said elongated body including at least one mounting channel having a base surface and an inclined surface which define a first channel opening and a second channel opening, said inclined surface terminating at said first channel opening to define a pivot edge, said latch member including a latch surface region;

inserting said elongated body in said wide opening portion until a cross section of said mounting plate is generally aligned with one of said first channel opening and said second channel opening;

moving said mounting plate in a direction such that said at least one mounting tab engages said at least one mounting channel;

aligning generally said latch member with said latch edge portion of said mounting plate; and rotating said mounting plate about said pivot edge until said latch surface region engages a portion of said outer surface of said mounting plate.

13. The method of claim 12, wherein said opening comprises a T-shaped opening and a slot, and said latch edge portion is located at said slot.

14. The method of claim 12, wherein said latch edge portion is located at an edge of said wide opening portion.

15. A lamp holder base for mounting a lamp holder to a mounting plate, comprising:

a bridge member have a first end, a second end and a support surface extending along a support plane;

at least one latch member coupled to said bridge member, said at least one latch member having a latch surface spaced at a distance away from said support plane; and an elongate body coupled to said second end of said bridge member and extending away from said support surface, said elongate body having a first region spaced apart from a second region, said elongate body including a first mounting surface located in said first region and a second mounting surface located in said second region, each of said first and second mounting surfaces being spaced at a distance away from said support plane.

16. The lamp holder base of claim 15, wherein said at least one latch member is a first latch member coupled to said first end of said bridge member and extending away from said support surface.

17. The lamp holder base of claim 16, wherein at least a portion of said first latch is resilient.

18. A lamp holder base for mounting a lamp holder to a mounting plate, comprising:

a bridge member having a first end, a second end and a support surface extending along a support plane;

at least one latch member coupled to said bridge member, said at least one latch member having a latch surface spaced at a distance away from said support plane; and an elongate body coupled to said second end of said bridge member and extending away from said support plane, at least one of said elongate body and said bridge member defining at least one slot, said at least one slot being configured to receive the mounting plate therein.

19. The lamp holder base of claim 18, wherein said at least one latch member is a first latch member coupled to said first end of said bridge member and extending away from said support surface.

20. The lamp holder base of claim 19, wherein at least a portion of said first latch is resilient.

* * * * *

UNITED STATES PATENT AND TRADEMARK OFFICE
CERTIFICATE OF CORRECTION

PATENT NO. : 6,190,200 B1
DATED : February 20, 2001
INVENTOR(S) : John W. Burwell It is certified that error appears in the above-identified patent and that said Letters Patent is hereby corrected as shown below:

Title page,
Under "References Cited" delete "6/1930" and substitute -- 11/1926 -- therefor.

Column 3,
Line 5, delete "members" and substitute -- member -- therefor.
Line 17, delete "members" and substitute -- member -- therefor.
Line 22, delete "an" therefor.
Line 35, delete "either of two exemplifications of mounting plates 16 160" and substitute -- mounting plate 16, -- therefor.

Column 8,
Line 18, delete "have" and substitute -- having -- therefor.

Signed and Sealed this

Sixteenth Day of October, 2001

*Attest:*

NICHOLAS P. GODICI
*Attesting Officer*   Acting Director of the United States Patent and Trademark Office